INVENTOR.
Yasukata Eguchi
BY Michael S. Striker
Attorney

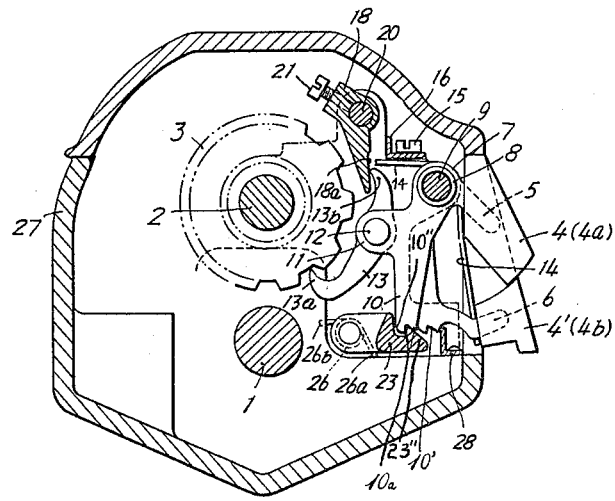
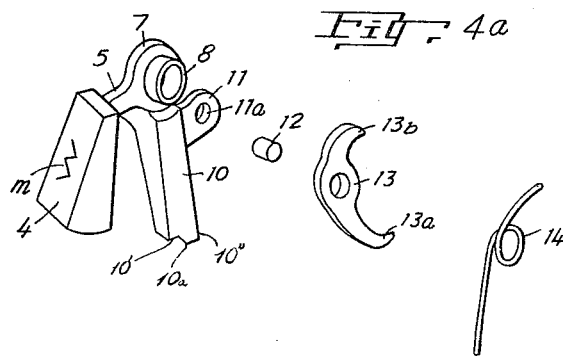
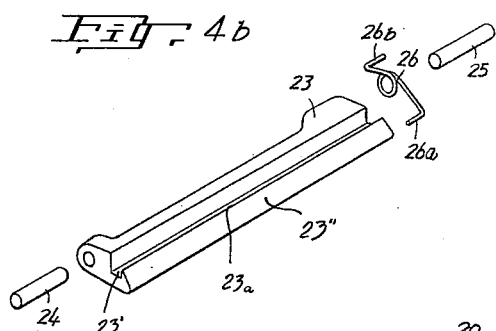
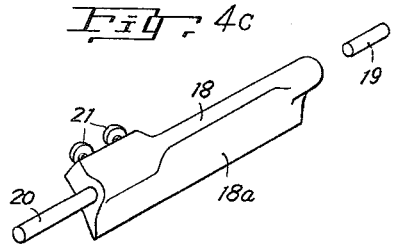

INVENTOR.
Yasukata Eguchi
BY Michael S. Striker
Attorney

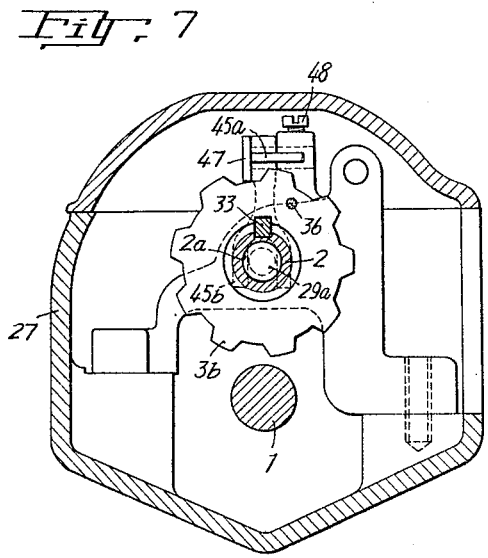
Fig. 7
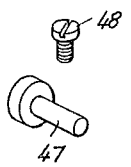
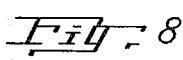
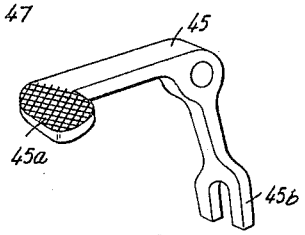
Fig. 8
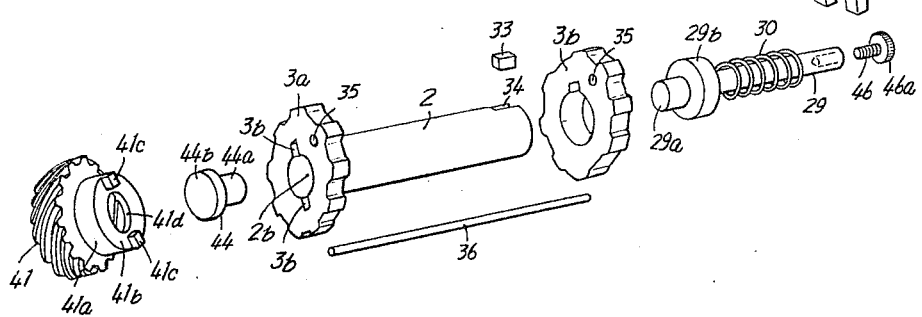
INVENTOR.
Yasukata Eguchi
BY Michael S. Striker United States Patent Office
3,279,402
Patented Oct. 18, 1966

3,279,402
CAM SELECTING ARRANGEMENT FOR ZIG-ZAG STITCH SEWING MACHINE
Yasukata Eguchi, Kunitachimachi, Tokyo, Japan, assignor to Janome Sewing Machine Co., Ltd., Tokyo, Japan
Continuation of application Ser. No. 802,691, Mar. 30, 1959. This application Nov. 6, 1963, Ser. No. 322,566
Claims priority, application Japan, Apr. 8, 1958, 33/17,586
12 Claims. (Cl. 112—158)

The present application is a continuation of my U.S. patent application Serial No. 802,691, filed March 30, 1959, and now abandoned, entitled "Cam Selecting Arrangement for Zig-Zag Stitch Sewing Machine."

The invention relates to a zigzag stitching sewing machine, and more specifically to a cam-selecting and -mounting arrangement therein.

The main object of this invention is to provide a novel push-button type cam selector, which operates effectively and provides, if wanted, any combination of two or more standardized stitch patterns, by selecting two or more push buttons and pushes-in them simultaneously to the service position.

A still further object is to provide a novel cam selector of the type above referred to, which is of simple, compact, rigid, durable and easy to manipulate.

Still another object is to provide a novel cam-mounting arrangement in combination, wherein only by operating a lever the cam packet together with cam shaft is quickly and conveniently disengaged from the service position in the machine.

Various further and more specific objects, features and advantages of the invention will appear from the description given below, taken in connection with the accompanying drawings illustrating by way of example a preferred embodiment of this invention.

In the drawings:

FIG. 3 shows a cross-section taken on the line III—III in FIG. 2;

FIGS. 4a, 4b and 4c represent perspective views of several constituents of the mechanism shown in FIGS. 2, 3 and 5, wherein, however, the parts being shown as separated from one after another;

FIG. 7 is a cross-section taken on the line VII—VII;

FIG. 8 represents perspective views of several constituents shown in FIGS. 6 and 7, wherein, however, the parts being shown as separated from one after another.

Figure 5:
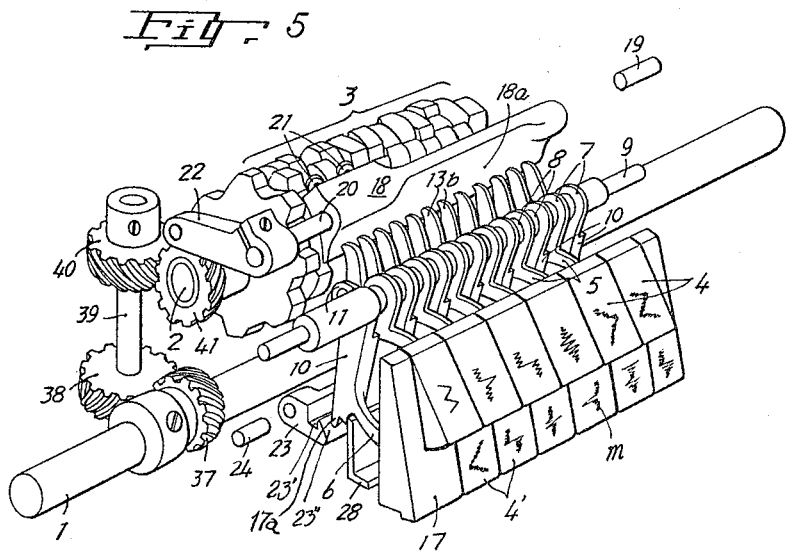
FIG. 5 represents a perspective view, showing the cam selector.

Now referring to FIGS. 2, 3 and 5, 1 denotes the main shaft of the machine, a cam shaft 2 rotatably mounted in the machine frame 27 above the former shaft and in a parallel relation thereto. The shaft 2 is driven through a reduction gearing, comprising wheels 37, 38, 40 and 41, from the main shaft 1, and provided with a cam block 3 rotatable with the shaft 2, as will be hereinafter described. Two groups of push buttons 4a and 4b, the number of which corresponds to that of cams of said packet 3, said button groups being arranged in two stages adjacent to each other in the machine frame 27. Each of the buttons 4 of the upper group 4a is formed with an arm 5, while each button 4' belonging to the lower group 4b is provided equally with an arm 6, said buttons of both groups 4a and 4b are each provided with boss 7 and flange 8 formed integrally therewith, said flanges of the both groups being mounted alternatively on a supporting shaft 9, as shown in FIGS. 3 and 5, which shaft is stationarily arranged in parallel relation to shafts 1 and 2. Each of buttons 4 and 4' is part of a selector member including a depending leg 10 as well as an upper projection 11 having an opening 11a, into which is inserted a pin 12, upon the latter an engaging pawl 13 is pivotally mounted. The pawl 13 is provided with upper and lower engaging projections 13a and 13b. On the other hand, the flange 8 is fitted with a spring 14, the upper end of which bears against an angle bar 16 fixed by means of set screws 15 on to the machine frame 27, while the opposite lower end urges the leg 10 of the corresponding push button 4 or 4' outwardly. A further push button 17 arranged at the left hand end of push button groups 4a and 4b, serves for returning already pushed-in button or buttons, if any, to the initial inoperative position, as will be hereinafter described more in detail, thus being provided with none of said engaging pawls. When any of the push buttons 4 and 4' is pushed-in into its operative position, the engaging projection 13a of the corresponding pawl 13 is brought into pressure-engagement with the corresponding cam of packet 3, so that with rotation thereof said pawl 13 reciprocates in rocking motion about pin 12. The motion is transmitted through a transmission plate 18, which is at its one end pivotally mounted on a supporting shaft 19, the latter being fixed to the machine frame 27, while the opposite end of said plate is fixed by means of set screws 21 to a further supporting shaft 20, the latter shaft being pivotally mounted in the machine frame. The upper engaging projection 13b of pawl 13 is kept in pressure-engagement with the co-operating surface 18a of said plate 18 and an arm 22 is fixed on one end of said further shaft 20, which is, as above referred to, fixed with motion-transmitting member 18, so that said rocking motion may be transmitted through arm 22 to the needle-bar assembly of the machine.

Figure 1:
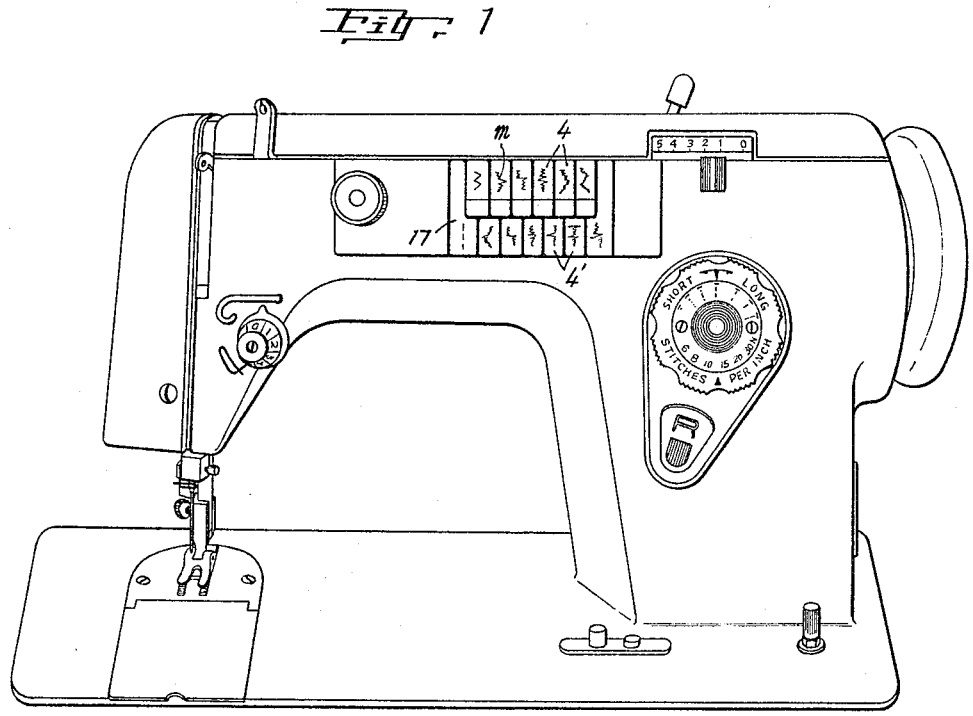
FIG. 1 illustrates a part of zigzag stitching sewing machine uncovered at its front.
Figure 2:
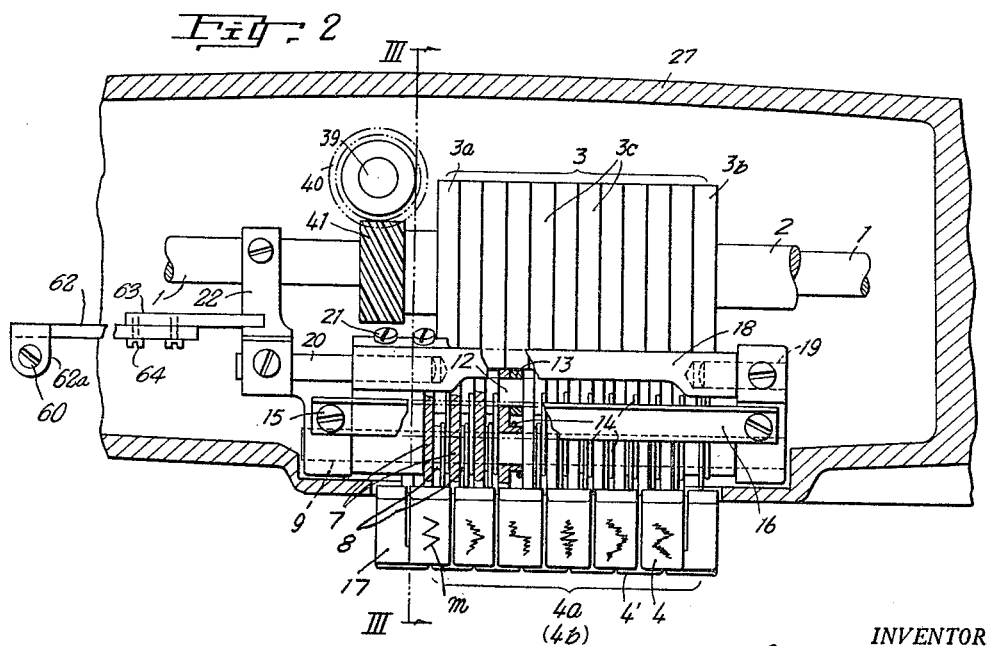
FIG. 2 is a plan view of a part of the sewing machine, partially sectioned, especially illustrating the push-button type cam selector mechanism, wherein, however, the cam-mounting arrangement is omitted for the clearness of the drawing.
Figure 9:
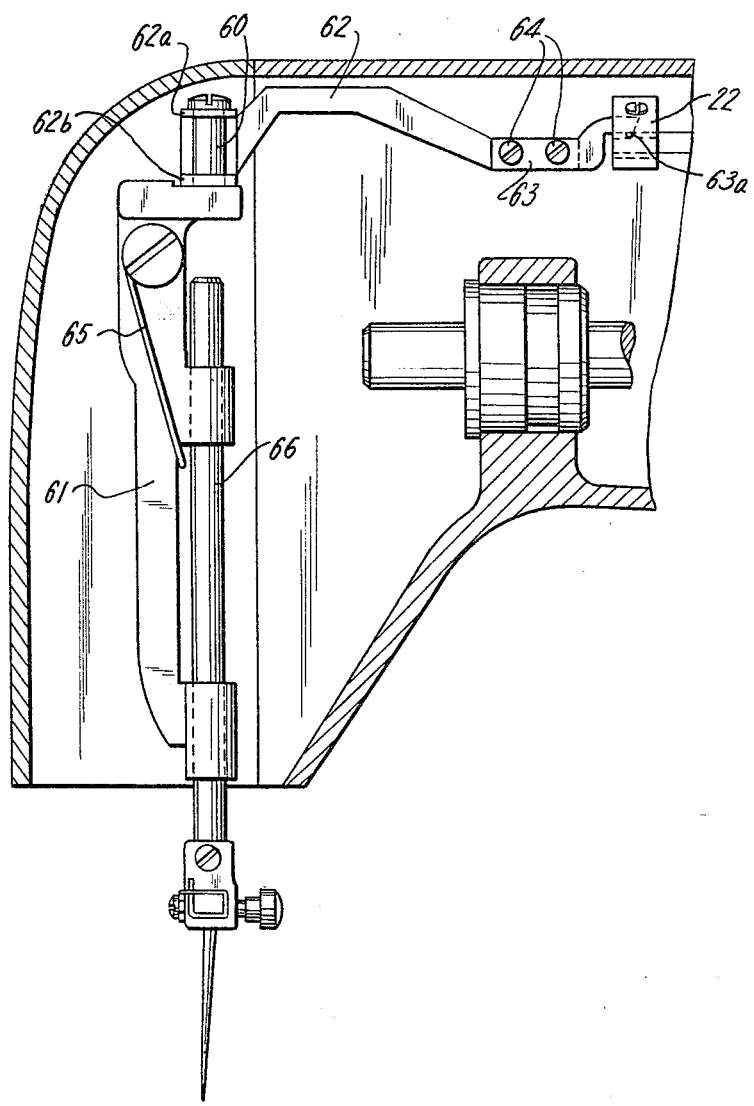
FIG. 9 is a sectional view illustrating the needle bar assembly.

On the upper end of a needle-bar support 61, a pivot pin 6 is mounted and turnably supports the flanges 62a and 62b of an operating rod 62 to which an operating member 63 is secured by screws 64. As shown in FIGS. 2 and 9, an edge 63a of member 63 is in contact with arm 22 of the motion transmitting means 18, 20, 22. Consequently, the reciprocating rocking motion of arm 22 is transmitted to the needle-bar assembly. A spring 65 is mounted on the needle-bar support 61 and engages the machine frame at one end to bias the needle-bar support into a normal position so that member 63 is biased to engage arm 22.

In the drawings, 23 represents a rockable elongated locking means arranged in parallel relation to cam shaft 2, said locking means having the form of a bar pivotally mounted at its both ends by means of pins 24 and 25, respectively. A spring 26 is mounted on said pin 25, one end 26a of the spring bears against said stopper 23 and the opposite end 26b engages with the machine frame under pressure, thus the spring, as will be hereinafter explained more fully, serves for returning the bar 23 to its initial position. This locking bar 23 is provided with a longitudinal groove 23', and a projection 10" on the tip of leg 10 of any of the push buttons 4 and 4' is arranged to engage groove 23' while the elongated projection 23a engages the recess 10' on the tip of the respective leg 10. A separate stop means 28 of L-shaped cross-section is arranged in parallel relation to the aforementioned locking bar 23 within the machine frame. When push buttons 4 and 4' are returned to their off-service positions, the end surface 10'' of each leg 10 is brought into engagement with the stopper plate 27 and thereafter rests thereon.

In operation of the above mentioned mechanism, the operator selects a desired zigzag sewing pattern *m* denoted on a push button 4 or 4' and pushes it in its service position, the button under consideration is rotated forwardly about the shaft 9 against the action of spring 14 fixed to the flange 8, thereby the projecting leg 10 is rotated in the forward direction at the same time. As already explained, the projection 11 is provided with pin 12 fixed thereto and the pawl 13 is adapted to pivot about the pin, the engaging projection 13a of each pawl 13 being urged to engage with the co-operating cam surface belonging to the packet 3, while the projection 10'' on the leg 10 of the respective push button 4 or 4' engages with the longitudinal groove 23' on the rockable locking bar 23, so that unintentional return of the button in its normal off-service position is positively prevented. In this case, the engaging projection 13a under consideration is kept in engaging contact with the corresponding cam surface, so that with rotation of the cam packet the change of the cam lift causes the co-operating pawl 13 to rock about the pin 12 to and fro, the movement of the pawl is thus transmitted to the motion-transmitting member 18 to cause it again in rocking motion, as the opposite engaging projection 13b of the pawl is kept in pressure engagement with the co-operating surface of the plate 18 (see FIG. 3), which is as was already explained pivotally mounted, thus the needle-assembly (see FIG. 9) operatively connected by linkage 62, 63 and arm 22 (see FIG. 2) with said plate 18 is operated to carry out the desired lateral rocking motion known per se.

When it is desired to change the already selected stitch pattern to any other suitable one, the operator pushes-in the correspondingly, newly selected push button, thereby, just in the same way as referred to above, the related pawl 13 is brought into engagement with both cam and transmission plate. In this case, however, the operating projection or leg 10 during the advancement of the push button pressed with its angular edge 10a upon the inclined surface 23'' formed on locking bar 23, which is thereby caused to turn downwards. Further, when the edge 10a passes over the top ridge 23a of the surface 23'' and projection 10'' engages in the groove 23', any other leg 10, which has been already engaged therein, is disengaged from the locking bar 23, thus causing the already selected and pushed-in button to return to the normal off-service position. In this returning, the newly off-serviced push button is kept in position by engagement of its leg 10 with the L-shaped stop bar 29. After cam selection has been thus altered, a new stitch pattern corresponding to the newly selected-out push button and illustrated thereon as is clear from FIG. 5 will be produced with continued running of the machine, until a still other cam selection will be carried into effect at the operative will.

According to this invention, any combination of two or more stitch patterns is obtainable, by pressing-in two or more desired push buttons at the same time, thereby causing the latter simultaneously to engage both the corresponding cams and the transmission plate while the actuated push buttons are held in operative positions by projection 23a engaging in the respective recesses 10'.

When any desired stitch pattern has been produced and come to the end, the related pawl 13 of the pushed-in button is kept in the engaged position. Disengagement and return of the pawl is carried out by pressing-in a separate push button 17 mounted at the left hand adjacent position, as clearly seen from FIGS. 2 and 5. This push button 17 is provided with no pawl or latch such as 13, as was already explained, and serves, when depressed, to disengage and return one or more already engaged normal push buttons. Clearing button 17 has a projecting edge 17a which engages the inclined surface 23'' when button 17 is operated. When edge 17a passes over edge 23a, the projection 10'' of any depressed cam selector button 4, 4' is released.

Figure 6:
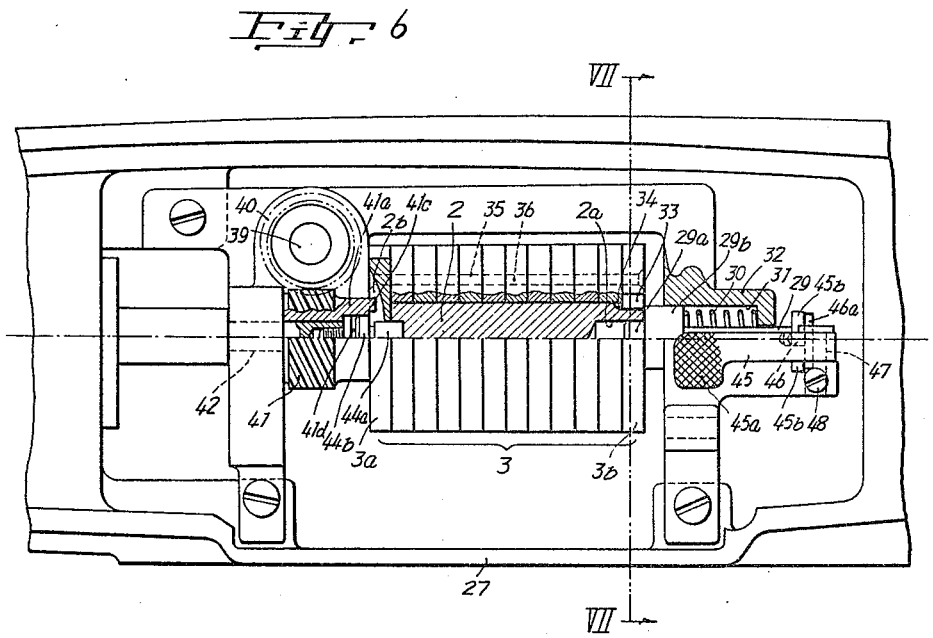
FIG. 6 is a similar view to that shown in FIG. 1, especially illustrating the cam-mounting arrangement, wherein, however, the cam selector is excluded to illustrate for the clearness of the drawing.

As will be explained hereinafter referring to FIGS. 6–8, the cam packet 3 is exchangeable with any other suitable set. When exchanged in this way, operation of one and the same push button will naturally produce a different stitch pattern. For this purpose, although not shown, diagrammatic representations *m* on each normal push button 4 or 4' may be preferably arranged in two or more suitable stages, or distinguished from each other stitch group by different colors.

The present machine can be further improved by employing a novel cam block mounting arrangement, which will be explained below by way of example referring to FIGS. 6–8. The cam shaft 2 is provided at its one end with a central bore 2a, into which is inserted a pin 29a of an axle means 29 which is provided with a flange 29b formed thereon and a spring 30, which is loosely mounted on the stem thereof, thus united axle means is rotatably mounted in a bearing or bore 31 of supporting part 32 provided in the machine frame 27. The cam 3a occupying one of the end positions, say, the left hand position in FIGS. 2 and 6, of the cam block 3 is fixed on tubular shaft 2, as shown in FIG. 8, while the opposite end cam 3b is arranged to be detachably mounted on the shaft 2 by means of key 33 and groove 34 (FIGS. 6 and 8). Between said both extreme cams 3a and 3b, there are arranged a plurality of intermediate cams 3c in direct contact relation one after another to constitute the cam block 3 together with the end cams. The cam block 3 is provided with a hole 35 passing in effect through all of the constituent cams 3a, 3b and 3c. When assembled, a pin 36 is inserted into the hole 35 to form rigidly a cam block in effect by a number of the cams. A driving gear 37 is fixed on main shaft 1 and meshes with a driven gear 38 fixed on an intermediate vertical shaft 39 at its one end, while a driving wheel 40 fixed on the opposite end of the said intermediate shaft engages with a driven toothed wheel 41 rotatably mounted on a shaft 42, said latter shaft 42 being fixedly mounted in the machine frame 27. The toothed wheel 41, as shown in FIG. 8, is provided with a pair of coupling projections 41c projecting the end surface 41b on the boss 41a thereof, the said projections being adapted to engage the mating lateral grooves 3b cut in the end cam 3a integral with cam shaft 2 for the purpose of transmitting the driving force from the main shaft 1 for rotation of cam block 3. A stepped connecting pin 44 is adapted to be inserted with its stem 44a in a bore 2b cut in the left hand end of cam shaft 2, as is clearly illustrated in FIG. 8, while the enlarged cylindrical portion 44b is so dimensioned that it detachably fits in the central bore 41d of toothed wheel 41, thus said pin, when assembled, serves for supporting left hand end of cam shaft 2, while the right hand end of the latter is rotatably mounted through axle means 29, after assembled, in the bearing 31, thereby the coil spring 30 urging the shaft 2 leftwards in FIGS. 2, 5, 6 and 8 through the intermediary of projecting flange 29b and thus positioning the cam block 3 at its normal service position. An L-shaped manipulating lever 45 is provided at its one end with an operating knob 45a, and at the opposite with a fork 45b, which engages the head 46a of a screw 46 screwed into the right hand end of connecting pin 29, the said lever 45 being pivoted at its intermediate portion on a pivot pin 47, the latter being fixed to the machine frame 27 by means of a set screw 48.

When it is desired to dismount quickly the cam block 3 from the machine, the operator presses down the operating knob 45a, thereby causing the forked end 45b of bellcrank lever 45 to turn in the counter-clockwise direction and thus shifting stop 46 together with axle means 29 and pin 29a against the action of spring 30 in the axial direction, until the pin 29a is disengaged from the bore 2a at the right hand end of tubular support 2. Thus, the operator can easily dismount the assembled cam block 3 together with tubular support shaft 2 from the machine.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims. Reference should accordingly be had to the appended claims in determining the scope of the invention.

What is claimed and desired to be secured by Letters Patent is:

1. Cam selecting arrangement comprising, in combination, a plurality of driven movable cams having different cam track patterns; a plurality of selector members respectively correlated with said cams; a cam follower attached to and movably mounted on each selector member; means for mounting each selector member for movement with its cam follower between a normal inoperative position in which the respective cam follower is spaced from the respective cam and an operative position in which said cam follower engages said cam and moves in accordance with the cam track pattern of the same; and motion transmitting means including a movable member operatively connected to and moved by said cam followers in said operative positions of said selector members so that said motion transmitting means moves in accordance with the cam track pattern of any cam selected by operation of selected selector members.

2. Cam selecting arrangement comprising, in combination, a plurality of driven movable cams having different cam track patterns; a plurality of selector members respectively correlated with said cams; a cam follower attached to and movably mounted on each selector member; means for mounting each selector member for movement with its cam follower between a normal inoperative position in which the respective cam follower is spaced from the respective cam and an operative position in which said cam follower engages said cam and moves in accordance with the cam track pattern of the same; locking means for locking said selector members in said operative positions and being movable to a releasing position releasing all said selector members for movement to said inoperative position, each selector member being operatively connected to and moving said locking means to said releasing position during movement to said operative position so that any other locked selector member is released; clearing means operatively connected to said locking means for moving the same to said releasing position; and motion transmitting means including a movable member operatively connected to and moved by said cam followers in said operative positions of said selector members so that said motion transmitting means moves in accordance with the cam track pattern of any cam selected by operation of selected selector members.

3. In a zig-zag sewing machine, a cam selecting arrangement comprising, in combination, a plurality of driven rotary stitch cams having different cam track patterns corresponding to different zig-zag stitches; a plurality of selector members respectively correlated with said stitch cams and zig-zag stitches; a cam follower pivotally mounted on each selector member; means for mounting each selector member for movement with its cam follower between a normal inoperative position in which the respective cam follower is spaced from the respective cam and an operative position in which said cam follower engages said cam and moves in accordance with the cam track pattern of the same; and motion transmitting means including a turnable member operatively connected to and rocked by said cam followers in said operative positions of said selector members so that said motion transmitting means moves in accordance with the cam track pattern of any stitch cam selected by operation of selected selector members.

4. In a zig-zag sewing machine, a cam selecting arrangement comprising, in combination, a plurality of driven rotary stitch cams having different cam track patterns corresponding to different zig-zag stitches; a plurality of selector members respectively correlated with said stitch cams and zig-zag stitches; a push button secured to each selector member; a cam follower movably mounted on each selector member; shaft means for pivotally mounting each selector member for turning movement with its cam follower between a normal inoperative position in which the respective cam follower is spaced from the respective cam and an operative position in which said cam follower engages said cam and moves in accordance with the cam track pattern of the same; and motion transmitting means including a turnable member operatively connected to and rocked by said cam followers in said operative positions of said selector members so that said motion transmitting means moves in accordance with the cam track pattern of any stitch cam selected by operation of selected selector members.

5. In a zig-zag sewing machine, a cam selecting arrangement comprising, in combination, a driven means; a set of rotary stitch cams coupled to said driven means for rotation therewith and having different peripheral cam track patterns corresponding to different zig-zag stitches; a set of selector members respectively correlated with said cams and zig-zag stitches, each selector member including a manually operated button; a cam follower pivotally mounted on each selector member; means for pivotally mounting each selector member for movement with its cam follower between a normal inoperative position in which the respective cam follower is spaced from the respective cam and an operative position in which one end portion of said cam follower engages said cam and moves in accordance with the cam track pattern of the same; releasable locking means for locking said selector members in said operative positions; and motion transmitting means including a bar extending across the other end portions of said cam followers and being mounted for pivotal movement about a longitudinal axis, said bar being spaced from cam followers whose correlated selector members are in said inoperative position and engaged by the other end portions of said cam followers in said operative positions of said selector members so that said bar is rocked about said longitudinal axis in accordance with the cam track pattern of any stitch cam selected by operation of a selected button, said motion transmitting means moving with said bar in accordance with selected cam track patterns.

6. In a zig-zag sewing machine, a cam selecting arrangement comprising, in combination, a driven means; a set of rotary stitch cams coupled to said driven means for rotation therewith and having different peripheral cam track patterns corresponding to different zig-zag stitches; a set of selector members respectively correlated with said cams and zig-zag stitches, each selector member including a manually operated button; a cam follower pivotally mounted on each selector member; means for pivotally mounting each selector member for movement with its cam follower between a normal inoperative position in which the respective cam follower is spaced from the respective cam and an operative position in which one end portion of said cam follower engages said cam and moves in accordance with the cam track pattern of the same; a locking bar extending across said selector members and being mounted for movement between a normal locking position and a releasing position, each selector member engaging and moving said locking bar to said releasing position during movement to said operative position so that any other locked selector member is released; a clearing member including a manually operated button and being operatively connected to said locking bar for moving the same to said releasing position; and motion transmitting means including a bar extending across the other end portions of said cam followers and being mounted for pivotal movement about a longitudinal axis, said bar being spaced from cam followers whose correlated selector members are in said inoperative position and engaged by the other end portions of said cam followers in said operative positions of said selector members so that said bar is rocked about said longitudinal axis in accordance with the cam track pattern of any stitch cam selected by operation of a selected button, said motion transmitting means moving with said bar in accordance with selected cam track patterns.

7. An arrangement as set forth in claim 6 wherein said locking bar is spring-loaded and has a longitudinal groove and an inclined face adjacent said groove; and wherein each selector member has a locking projection engaging said groove in said operative position, and is spring-loaded and biased to return to said inoperative position upon release by said locking bar.

8. An arrangement as set forth in claim 7 and including a stop member extending across said selector members, said spring-loaded selector members abutting said stop member in said inoperative positions.

9. In a zig-zag sewing machine, a cam selecting arrangement comprising, in combination, a driven means; a coupling means connected to said driven means for rotation; a set of stitch cams having different peripheral cam track patterns corresponding to different zig-zag stitches and secured to each other to form a cam block, said cam block being movable to and from a coupled position and including a coupling member engaged by said coupling means in said coupling position and connected by the same to said driven means for rotation; biased means normally holding said cam block in said coupled position; manually operated means for shifting said biased means to a position releasing said cam block so that the same may be removed; a plurality of selector members respectively correlated with said stitch cams and zig-zag stitches; a cam follower pivotally mounted on each selector member; means for mounting each selector member for movement with its cam follower between a normal inoperative position in which the respective cam follower is spaced from the respective cam and an operative position in which said cam follower engages said cam and moves in accordance with the cam track pattern of the same; and motion transmitting means including a turnably mounted member operatively connected to and rocked by said cam followers in said operative positions of said selector members so that said motion transmitting means moves in accordance with the cam track pattern of any stitch cam selected by operation of selected members.

10. In a zig-zag sewing machine, a cam selecting arrangement comprising, in combination, a driven means; a coupling means connected to said driven means for rotation; a set of stitch cams having different peripheral cam track patterns corresponding to different zig-zag stitches and secured to each other to form a cam block, said cam block being movable to and from a coupled position and including a coupling member engaged by said coupling means in said coupling position and connected by the same to said driven means for rotation about an axis; biased axle means supporting said cam block for rotation and including a projecting portion abutting one end face of said cam block for normally holding said cam block in said coupled position; manually operated means for shifting said biased axle means in axial direction to a position releasing said cam block so that the same may be removed; a plurality of selector members respectively correlated with said stitch cams and zig-zag stitches; a cam follower pivotally mounted on each selector member; means for mounting each selector member for movement with its cam follower between a normal inoperative position in which the respective cam follower is spaced from the respective cam and an operative position in which said cam follower engages said cam and moves in accordance with the cam track pattern of the same; and motion transmitting means including a turnably mounted member operatively connected to and rocked by said cam followers in said operative positions of said selector members so that said motion transmitting means moves in accordance with he cam track pattern of any stitch cam selected by operation of selected members.

11. An apparatus as set forth in claim 10 wherein said cam block includes a tubular support receiving said axle means in one end thereof, said coupling member being a stitch cam fixed at the other end of said tubular support and the other cams being slidably mounted on said tubular support; and a means detachably connecting said other cams to said one cam for rotation with the same.

12. An apparatus as set forth in claim 11 wherein said axle means is spring-loaded and has a stop part; means for mounting said axle means for movement in the direction of said axis; and wherein said manually operated means is a lever having a forked end portion embracing said axle means and abutting said stop part for shifting said axle means in the direction of said axis to a position releasing said cam block for removal.

References Cited by the Examiner
UNITED STATES PATENTS

| | | | |
|---|---|---|---|
| 3,034,461 | 5/1962 | Urscheler | 112—158 |
| 3,143,985 | 8/1964 | Reeber et al. | 112—158 |

JORDAN FRANKLIN, *Primary Examiner.*

ROBERT V. SLOAN, *Examiner.*

R. J. SCANLAN, Jr., *Assistant Examiner.*